United States Patent
Tringali et al.

(10) Patent No.: US 12,533,822 B2
(45) Date of Patent: Jan. 27, 2026

(54) HAIR CLIPPER WITH LINEAR ACTUATOR

(71) Applicant: Andis Company, Sturtevant, WI (US)

(72) Inventors: Richard J. Tringali, Racine, WI (US); Jeffrey D. Gross, Kenosha, WI (US)

(73) Assignee: Andis Company, Sturtevant, WI (US)

( * ) Notice: Subject to any disclaimer, the term of this patent is extended or adjusted under 35 U.S.C. 154(b) by 408 days.

(21) Appl. No.: 18/063,247

(22) Filed: Dec. 8, 2022

(65) Prior Publication Data

US 2023/0107628 A1    Apr. 6, 2023

Related U.S. Application Data

(63) Continuation of application No. PCT/US2021/036762, filed on Jun. 10, 2021.

(60) Provisional application No. 63/037,734, filed on Jun. 11, 2020.

(51) Int. Cl.
    *B26B 19/28*    (2006.01)
    *B26B 19/12*    (2006.01)

(52) U.S. Cl.
    CPC ............ *B26B 19/282* (2013.01); *B26B 19/12* (2013.01)

(58) Field of Classification Search
    CPC ....... B26B 19/282; B26B 19/12; B26B 19/06; H02K 7/14; H02K 33/02
    USPC .................................................. 318/159, 160
    See application file for complete search history.

(56) References Cited

U.S. PATENT DOCUMENTS

| | | |
|---|---|---|
| 4,460,854 A | 7/1984 | Bauer |
| 4,751,487 A | 6/1988 | Green, Jr. |
| 4,937,481 A | 6/1990 | Vitale |
| 4,994,698 A | 2/1991 | Kliman et al. |
| 5,444,313 A | 8/1995 | Oudet |
| 5,559,378 A | 9/1996 | Oudet et al. |
| 5,632,087 A | 5/1997 | Motohashi et al. |
| 5,736,797 A | 4/1998 | Motohashi et al. |
| 5,757,091 A | 5/1998 | Sogabe et al. |
| 5,921,134 A | 7/1999 | Shiba et al. |
| 5,955,799 A | 9/1999 | Amaya et al. |
| 6,005,462 A | 12/1999 | Myers |
| 6,028,499 A | 2/2000 | Oudet et al. |
| 6,181,090 B1 | 1/2001 | Amaya et al. |

(Continued)

FOREIGN PATENT DOCUMENTS

| | | |
|---|---|---|
| JP | 2005-0341771 | 12/2005 |
| JP | 2007-190312 | 8/2007 |

(Continued)

OTHER PUBLICATIONS

International Search Report and Written Opinion for International Application No. PCT/US2021/036762, dated Sep. 24, 2021, 11 pages.

*Primary Examiner* — David Luo
(74) *Attorney, Agent, or Firm* — Reinhart Boerner Van Deuren s.c.

(57) ABSTRACT

A linear actuator or motor for oscillating a blade is provided. The linear actuator replaces an eccentric drive and yoke, resulting in a linear powered drive to oscillate the blade linearly. This operation facilitates the formation of a smaller and/or lighter hair clipper. The linear actuator uses alternating current to oscillate a permanent against a biasing force produced by a set of springs. The permanent magnet is located opposite a stator with an electromagnetic coil that generates an electromagnetic force to oscillate the permanent magnet.

15 Claims, 15 Drawing Sheets

(56) References Cited

U.S. PATENT DOCUMENTS

| | | |
|---|---|---|
| 6,219,920 B1 | 4/2001 | Klein |
| 6,236,125 B1 | 5/2001 | Oudet et al. |
| 6,249,065 B1 | 6/2001 | Oudet et al. |
| 6,441,517 B1 * | 8/2002 | Brum .................. B26B 19/282 310/36 |
| 6,520,269 B2 | 2/2003 | Geiger et al. |
| 6,548,971 B2 | 4/2003 | Gokturk |
| 6,791,222 B1 | 9/2004 | Maslov et al. |
| 6,892,457 B2 | 5/2005 | Shiba et al. |
| 6,933,827 B2 | 8/2005 | Takeuchi et al. |
| 6,936,937 B2 | 8/2005 | Tu et al. |
| 6,946,756 B2 | 9/2005 | Shimizu et al. |
| 6,958,554 B2 | 10/2005 | Fujiwara et al. |
| 6,991,217 B2 | 1/2006 | Shimizu et al. |
| 7,017,270 B2 | 3/2006 | Shiba et al. |
| 7,053,507 B2 | 5/2006 | Kobayashi et al. |
| 7,102,475 B2 | 9/2006 | Nakagawa et al. |
| 7,334,338 B2 | 2/2008 | Shiba et al. |
| 7,350,300 B2 | 4/2008 | Yamaguchi et al. |
| 7,446,495 B2 * | 11/2008 | Tse ........................ B26B 19/06 318/494 |
| 7,474,065 B2 | 1/2009 | Kraus |
| 7,535,148 B2 | 5/2009 | Harris et al. |
| 7,589,445 B2 | 9/2009 | Gandel et al. |
| 7,607,229 B2 | 10/2009 | Motohashi et al. |
| 7,730,621 B2 | 6/2010 | Komori et al. |
| 7,832,104 B2 | 11/2010 | Yamasaki et al. |
| 7,898,122 B2 | 3/2011 | Andrieux et al. |
| 7,965,000 B2 | 6/2011 | Komori et al. |
| 8,011,102 B2 | 9/2011 | Sato et al. |
| 8,112,892 B2 | 2/2012 | Haczek et al. |
| 8,198,866 B2 | 6/2012 | Vetter |
| 8,381,405 B2 | 2/2013 | Shigeta et al. |
| 8,464,429 B2 | 6/2013 | Haczek et al. |
| 8,479,397 B2 | 7/2013 | Sato et al. |
| 8,680,723 B2 | 3/2014 | Subramanian et al. |
| 8,806,763 B2 | 8/2014 | Shiba et al. |
| 8,928,747 B2 | 1/2015 | Burdoucci |
| 9,276,454 B2 | 3/2016 | Arlot et al. |
| 9,325,230 B2 | 4/2016 | Yamada et al. |
| 9,537,441 B2 | 1/2017 | Ibuki et al. |
| 9,729,023 B2 | 8/2017 | Komori et al. |
| 9,925,676 B2 | 3/2018 | Krenik |
| 9,993,930 B2 | 6/2018 | Kraus et al. |
| 10,035,273 B2 | 7/2018 | Ring et al. |
| 10,071,490 B2 | 9/2018 | Shimizu et al. |
| 10,511,214 B2 * | 12/2019 | Hu ........................ B26B 19/284 |
| 2002/0055695 A1 | 5/2002 | Takahata et al. |
| 2003/0094861 A1 | 5/2003 | Shimizu et al. |
| 2003/0145469 A1 | 8/2003 | Ogawa et al. |
| 2003/0167638 A1 | 9/2003 | Bader et al. |
| 2004/0061384 A1 | 4/2004 | Yatsuzuka et al. |
| 2005/0140219 A1 | 6/2005 | Sanematsu et al. |
| 2005/0173662 A1 | 8/2005 | Shimizu et al. |
| 2005/0200207 A1 | 9/2005 | Hasegawa et al. |
| 2005/0212365 A1 | 9/2005 | Kraus et al. |
| 2006/0021227 A1 | 2/2006 | Shiba et al. |
| 2006/0042095 A1 | 3/2006 | Yamaguchi et al. |
| 2006/0059696 A1 | 3/2006 | Derby et al. |
| 2006/0145547 A1 | 7/2006 | Kraus |
| 2006/0207103 A1 | 9/2006 | Tse et al. |
| 2006/0250043 A1 | 11/2006 | Chung |
| 2006/0273674 A1 | 12/2006 | Aiello et al. |
| 2007/0056166 A1 | 3/2007 | Shiba et al. |
| 2007/0113409 A1 | 5/2007 | Schaaf |
| 2007/0137043 A1 | 6/2007 | Kraus et al. |
| 2007/0176504 A1 | 8/2007 | Otsuki et al. |
| 2008/0040928 A1 | 2/2008 | Royle et al. |
| 2008/0155831 A1 | 7/2008 | Royle |
| 2008/0196258 A1 | 8/2008 | Kraus |
| 2008/0284261 A1 | 11/2008 | Andrieux et al. |
| 2008/0307654 A1 | 12/2008 | Motohashi et al. |
| 2009/0025229 A1 | 1/2009 | Kappes et al. |
| 2009/0199413 A1 | 8/2009 | Tautscher et al. |
| 2009/0267422 A1 | 10/2009 | Komori et al. |
| 2010/0126022 A1 | 5/2010 | Shiba et al. |
| 2011/0197726 A1 | 8/2011 | Kraus |
| 2011/0203061 A1 | 8/2011 | Takahashi et al. |
| 2012/0022556 A1 | 1/2012 | Sanchez-Martinez |
| 2012/0112565 A1 | 5/2012 | Lee |
| 2012/0216409 A1 | 8/2012 | Shigeta et al. |
| 2013/0239414 A1 | 9/2013 | Haczek et al. |
| 2013/0342035 A1 | 12/2013 | Kim |
| 2014/0001889 A1 | 1/2014 | Hong |
| 2014/0152126 A1 | 6/2014 | Kim et al. |
| 2016/0307712 A1 | 10/2016 | Nishimura et al. |
| 2018/0085934 A1 | 3/2018 | Erndt et al. |
| 2018/0085938 A1 | 3/2018 | Peter et al. |
| 2018/0085941 A1 | 3/2018 | Krauss et al. |
| 2018/0111278 A1 | 4/2018 | Godlieb et al. |
| 2018/0304479 A1 | 10/2018 | Murakami et al. |
| 2018/0304480 A1 | 10/2018 | Murakami et al. |
| 2018/0304481 A1 | 10/2018 | Murakami et al. |
| 2018/0304482 A1 | 10/2018 | Murakami et al. |
| 2018/0311841 A1 | 11/2018 | Kraus et al. |
| 2018/0311842 A1 | 11/2018 | Kraus et al. |
| 2018/0311843 A1 | 11/2018 | Kraus et al. |
| 2018/0319028 A1 | 11/2018 | Kraus et al. |

FOREIGN PATENT DOCUMENTS

| | | |
|---|---|---|
| WO | WO00/58976 | 10/2000 |
| WO | WO2004/028759 | 4/2004 |
| WO | WO2009/119450 | 10/2009 |

* cited by examiner

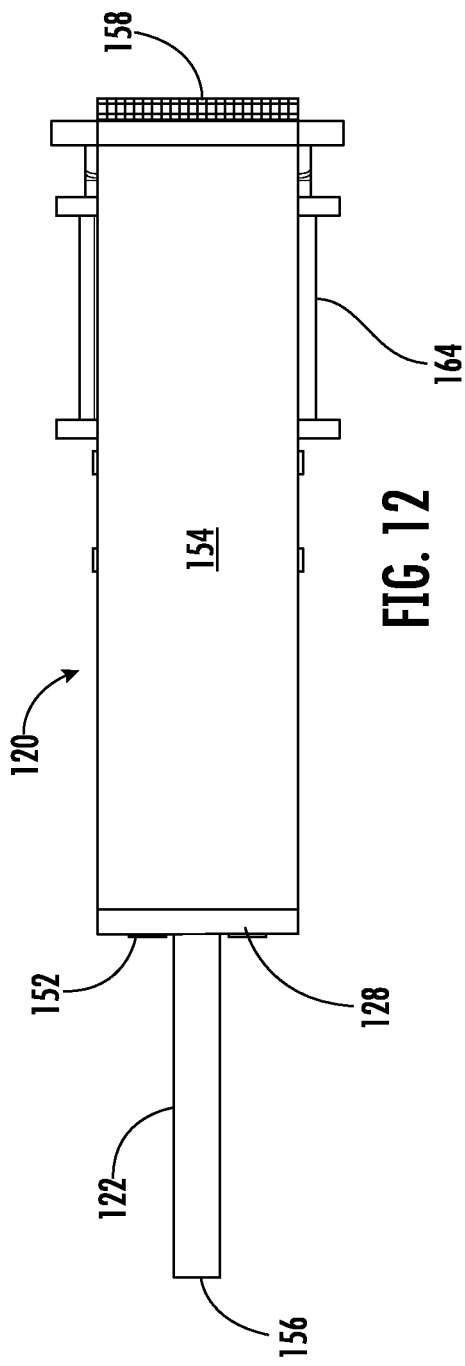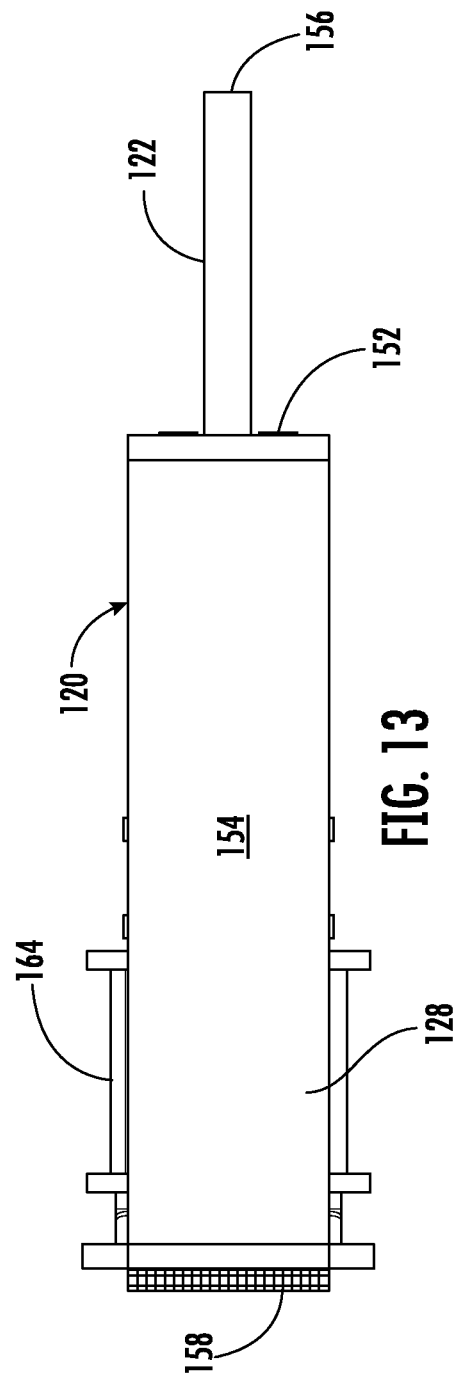

HAIR CLIPPER WITH LINEAR ACTUATOR

CROSS-REFERENCE TO RELATED PATENT APPLICATIONS

The present application is a continuation of International Application No. PCT/US2021/036762, filed Jun. 10, 2021, which claims the benefit of and priority to U.S. Provisional Application No. 63/037,734, filed on Jun. 11, 2020, which are incorporated herein by reference in their entireties.

BACKGROUND OF THE INVENTION

The present invention relates generally to the field of hair clippers or a hair cutting apparatus. The present invention relates specifically to a linear actuator or motor configured to drive a reciprocating blade on a blade assembly of the hair cutters.

SUMMARY OF THE INVENTION

One embodiment of the invention relates to a linear motor for a hair cutting device. The linear actuator includes a shaft, a generally U-shaped bracket, a permanent magnet, a pair of flat-bar springs, and a stator. The shaft extends along a longitudinal axis through the U-shaped bracket that has 2 parallel legs joined by a support rail that has an opening. The permanent magnet extends along an axial axis and is coupled to the shaft. The shaft passes through the opening of the bracket. The pair of flat-bar springs are coupled to the permanent magnet and the support rail. The springs each extend along a longitudinal axis. A non-zero angle is formed between the longitudinal axis of the shaft and the longitudinal axes of the springs. The stator is located opposite the permanent magnet and includes an electromagnetic coil. When an alternating current passes through the electromagnetic coil, the shaft oscillates.

Another embodiment of the invention relates to a hair cutter comprising a linear actuator. The linear actuator includes a shaft, a permanent magnet, a spring, and a liner motor. The permanent magnet is coupled to the shaft and extends along an axial axis. The spring is coupled to the permanent magnet and biases the permanent magnet along the axial axis. The linear stator is located opposite the permanent magnet and includes an electromagnet that generates an electromagnetic force that causes the permanent magnet and the shaft to oscillate linearly along the axial axis. The linear motor is coupled to the shaft that drives a blade of the hair cutter.

Another embodiment of the invention relates to a linear motor for a hair cutting device. The linear motor includes a bracket, a frame, a permanent magnet, a spring, and a linear stator. The frame is removably coupled to the bracket. The permanent magnet extends along an axial axis and is coupled to a shaft passing through an opening of the bracket. The spring is coupled to and located between the permanent magnet and the bracket. The spring extends along a longitudinal axis. A non-zero angle is formed between the axial axis of the permanent magnet and the longitudinal axis of the spring. The linear stator is coupled to the frame opposite the permanent magnet and includes an electromagnetic coil. When a current passes through the electromagnetic coil, an electromagnetic force causes the permanent magnet to oscillate linearly along the axial axis and a tip of the shaft to oscillate linearly in a direction parallel to the axial axis.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 12 is an isometric view of a first side of the linear actuator of FIG. 2, according to an exemplary embodiment.

FIG. 13 is an isometric view of a second side opposite the first side of the linear actuator of FIG. 12, according to an exemplary embodiment.

DETAILED DESCRIPTION

Figure 1:
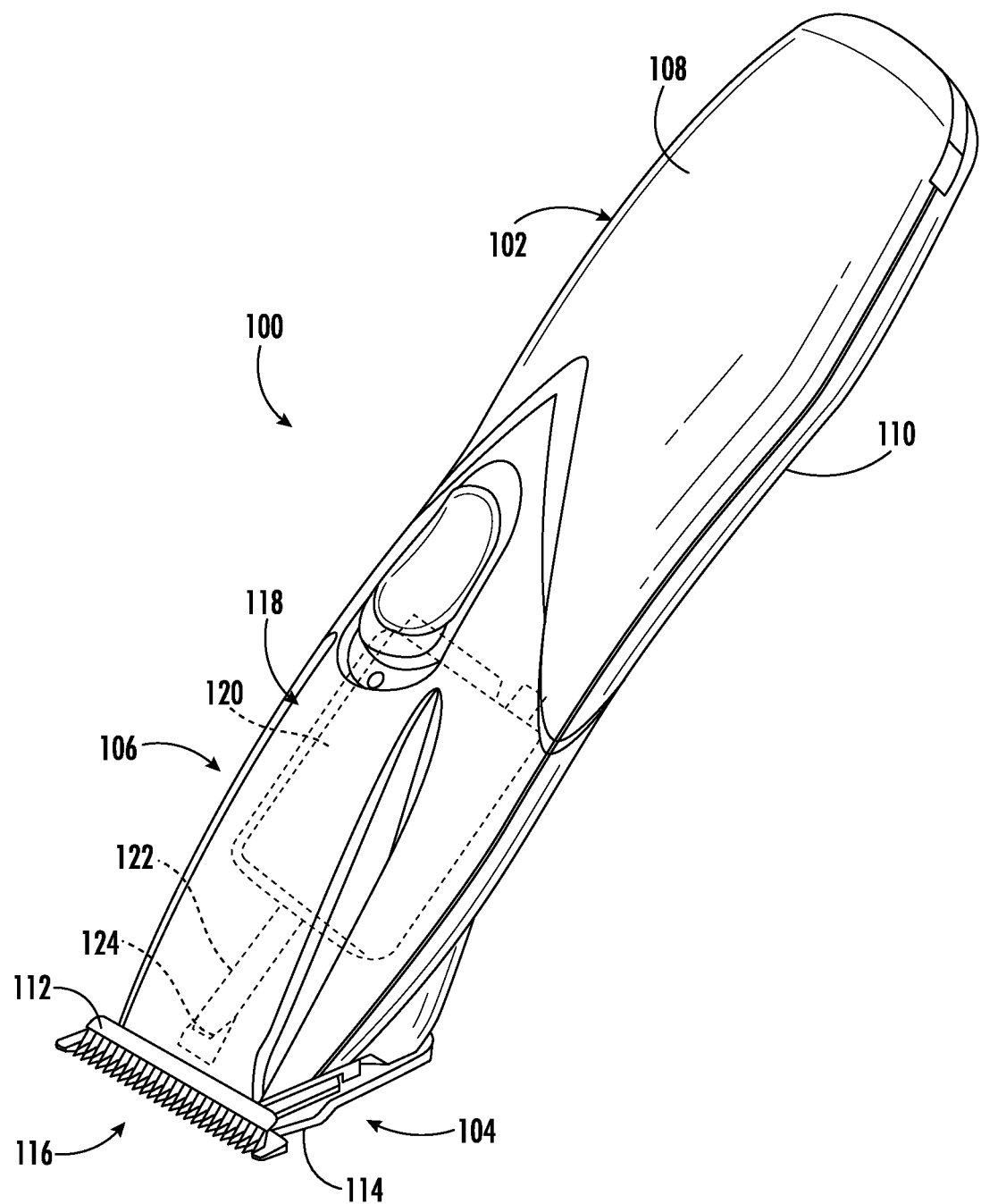
FIG. 1 is a perspective view of a hair cutting device with a linear actuator, according to an exemplary embodiment.

FIG. 1 illustrates an example embodiment of a hair cutting apparatus, trimmer, clipper, or cutter 100. Cutter 100 includes a body 102, a blade set or blade assembly 104, and a drive assembly 106. As illustrated in FIG. 1, body 102 is hand-held and includes a clamshell configuration of two portions: a first or upper housing 108 and a second or lower housing 110 (e.g., on a top and bottom of cutter 100). Cutter 100 body 102 may include other configurations. For example upper housing 108 and/or lower housing 110 form a single integral body 102 or component part. Body 102 could join housing 108 and/or housing 110 in other clamshell configurations (e.g., from one or more sides) and may include additional parts on the top, bottom, sides, or ends of body 102. Blade assembly 104 includes a translating, upper, or inner blade 112 and a stationary, lower, or outer blade 114. Body 102 and housing 108 and/or 110 define a cutting end 116 that includes blade assembly 104. Body 102 further defines a cavity 118 to support a linear actuator 120. As illustrated in FIG. 1, cavity 118 is formed from a clamshell configuration of upper housing 108 and lower housing 110 such that body 102 surrounds drive assembly 106 and linear actuator 120 coupled to blade assembly 104.

Drive assembly 106 is positioned within cavity 118 and couples blade assembly 104 to linear actuator 120. As illustrated, linear actuator 120 is an electric linear actuator 120. In other embodiments, linear actuator 120 is a pivot motor or a magnetic linear actuator 120 that generates oscillating or reciprocating movement for blade assembly 104 (e.g., drive assembly 106 couples to inner blade 112 to oscillate inner blade 112 over a stationary outer blade 114). In other embodiments, linear actuator 120 is an AC electric motor or any other suitable motor for generating oscillating or reciprocating movement for a blade assembly 104, e.g., inner blade 112 and/or outer blade 114. As illustrated, linear actuator 120 is configured to operate on battery power (e.g., cordless), but may be configured to operate with electricity from any suitable electric source, e.g., a corded cutter 100 plugged into an outlet.

Linear actuator 120 couples to an output shaft 122 that oscillates linearly over inner blade 112. Shaft 122 is configured to engage a yoke 124 of blade assembly 104 and translate or oscillate inner blade 112 linearly. Blade assembly 104 is coupled to cutting end 116 of body 102. For example, blade assembly 104 couples to body 102 with an adhesive, a rivet, a weld, a bolt, a screw, or at least one fastener. For example, shaft 122 oscillates linearly within yoke 124 that is coupled to inner blade 112, so that linear actuator 120 oscillates shaft 122 that is coupled to inner blade 112 to oscillate inner blade 112 over stationary outer blade 114. In this way, shaft 122 is coupled to inner blade 112.

Figure 2:
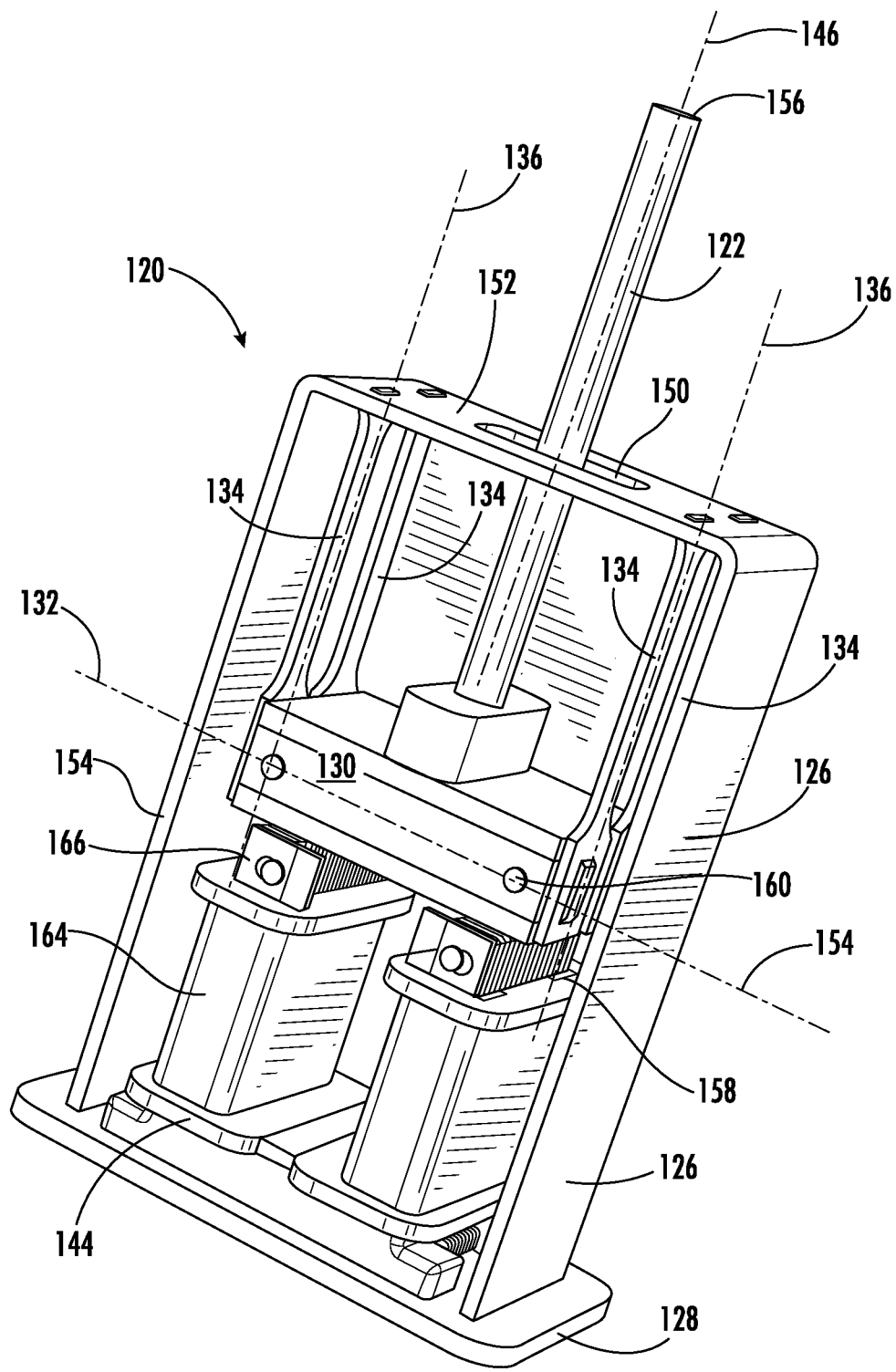
FIG. 2 is a perspective view of a linear actuator, according to an exemplary embodiment.

As shown in FIG. 2, linear actuator 120 for cutter 100 includes a U-shaped bracket 126 removably coupled to a frame 128. A permanent magnet 130 extends along a first longitudinal or axial axis 132. Frame 128 and/or a portion of bracket 126 may be substantially parallel to axial axis 132. A plurality of springs 134 couple permanent magnet 130 to bracket 126 and extend along a second elongated longitudinal axis 136. A stator 138 is coupled to frame 128 and located opposite permanent magnet 130. Stator 138 includes an electric coil 140 and/or winding 142 that receives an electric current to generate an electromagnetic force that oscillates permanent magnet 130 relative to the stationary stator 138.

Frame 128 supports stator 138 and is coupled to a base 144 of bracket 126 to releasably secure or couple bracket 126 and frame 128 to surround permanent magnets 130, springs 134, and/or stator 138.

A shaft 122 extends along a third longitudinal axis 146 substantially parallel to the extended axis 136 of springs 134. Shaft 122 couples to magnet 130 via a press fitting 148 and passes through an opening 150 of bracket 126. For example, shaft 122 passes through opening 150 in a midsection or support rail 152 of bracket 126 supported by two parallel opposing legs 154 for U-shaped bracket 126. Support rail 152 couples to a plurality of springs 134 (e.g., two, four, six, eight, or more) that support opposite sides of one or more permanent magnets 130. Support rail 152 surrounds shaft 122 extending along longitudinal axis 146 as it oscillates linearly against the bias of springs 134 within bracket 126. Such that a tip 156 of shaft 122 oscillates linearly and in a direction substantially parallel to the oscillation of permanent magnet 130 along axial axis 132. For example, springs 134 bias permanent magnets 130 along axial axis 132 to facilitate linear oscillation of shaft 122 as permanent magnets 130 respond to the electromagnetic forces generated by stator 138.

Figure 3:
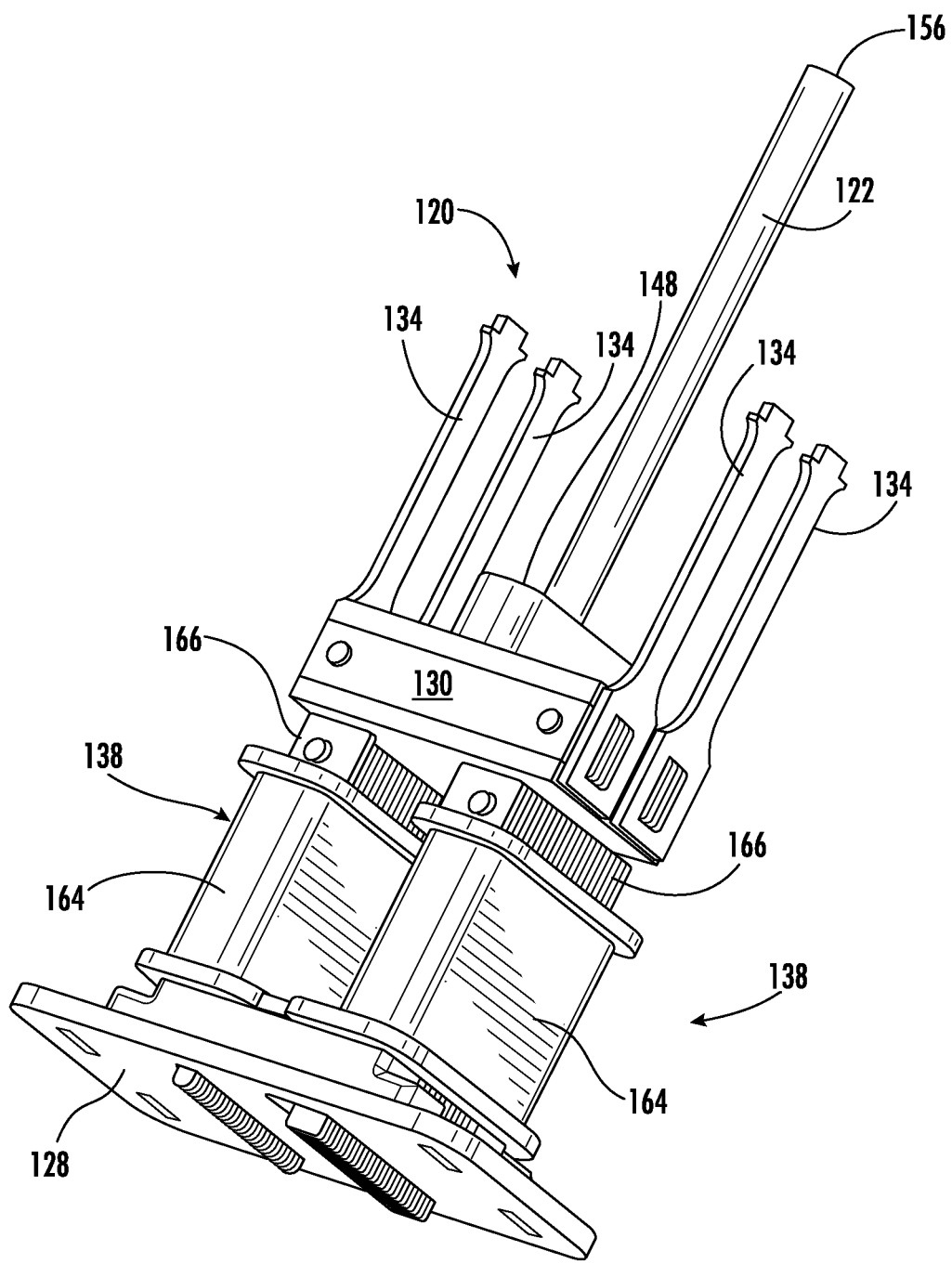
FIG. 3 is a perspective view of the linear actuator of FIG. 2 with the bracket removed, according to an exemplary embodiment.

FIG. 3 is a bottom perspective view of linear actuator 120 shown in FIG. 2, with bracket 126 removed. As shown, four springs 134 couple to opposite ends of two permanent magnets 130. A pair of flat-bar springs 134 on either end of each permanent magnet 130 couple permanent magnets 130 to support rail 152 of bracket 126 (FIG. 2). Springs 134 each extend along longitudinal axis 146.

Figure 4:
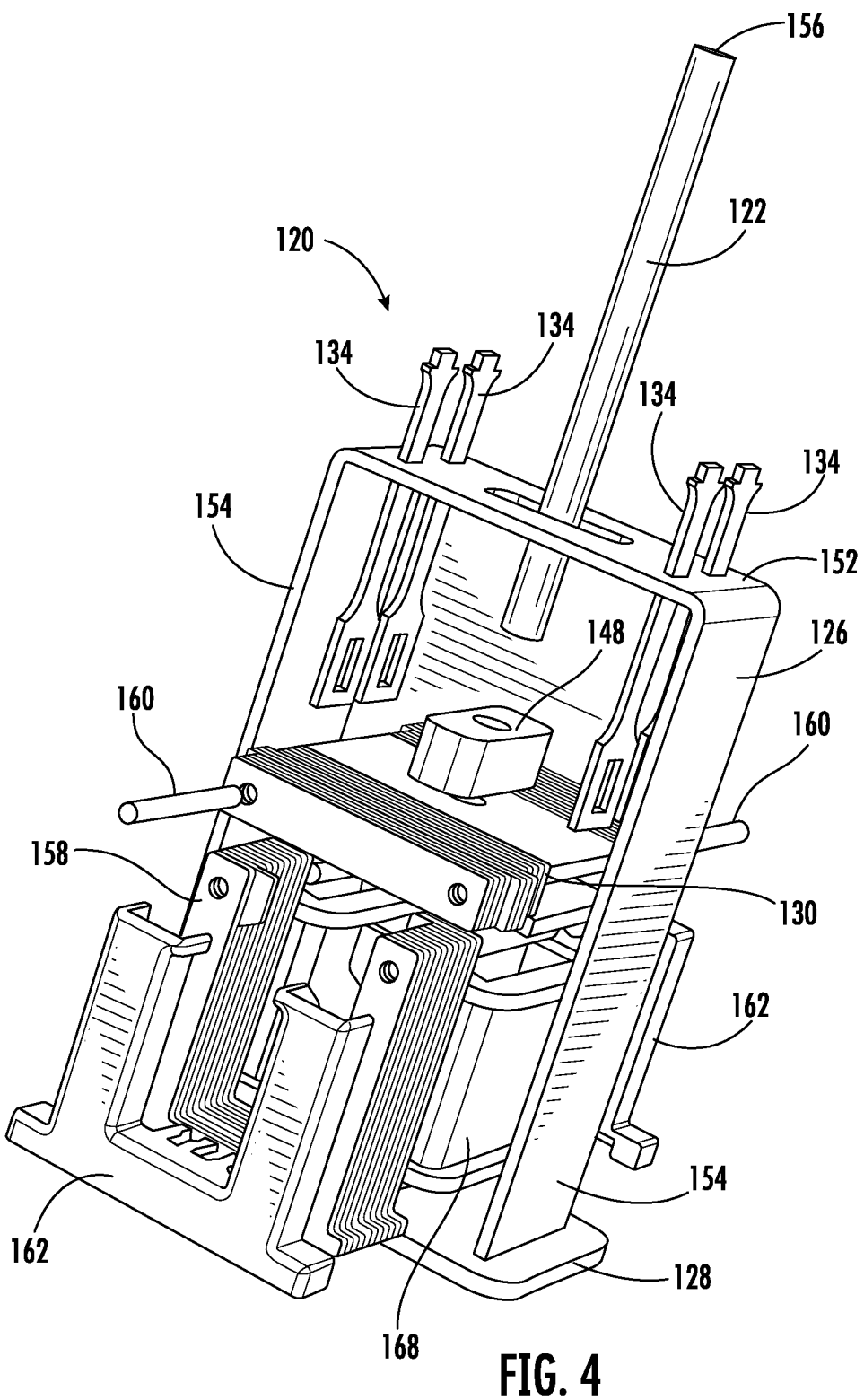
FIG. 4 is a partially exploded perspective view of the linear actuator of FIG. 2, according to an exemplary embodiment.
Figure 5:
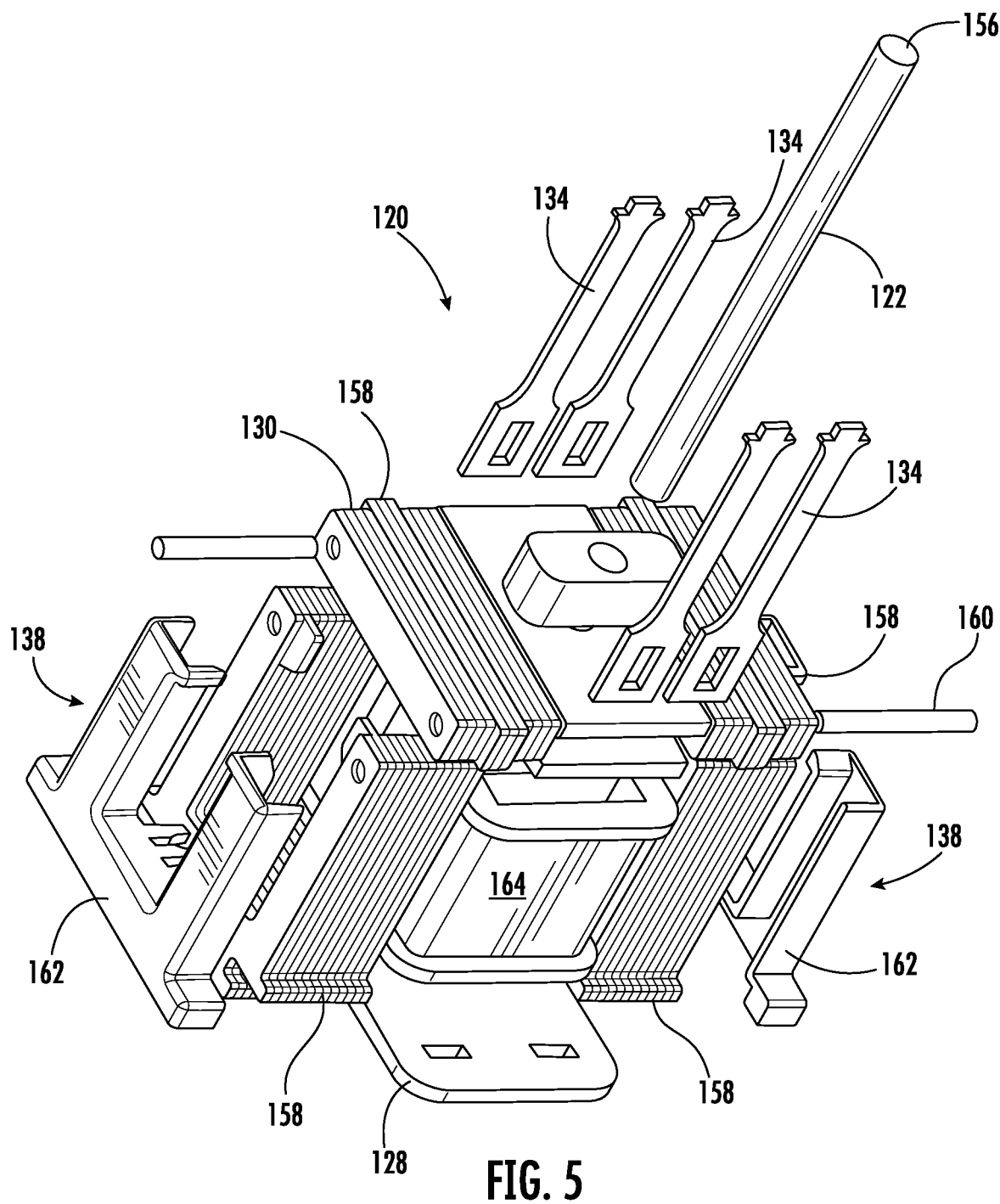
FIG. 5 is a top exploded perspective view of the linear actuator of FIG. 2 with the bracket removed, according to an exemplary embodiment.
Figure 6:
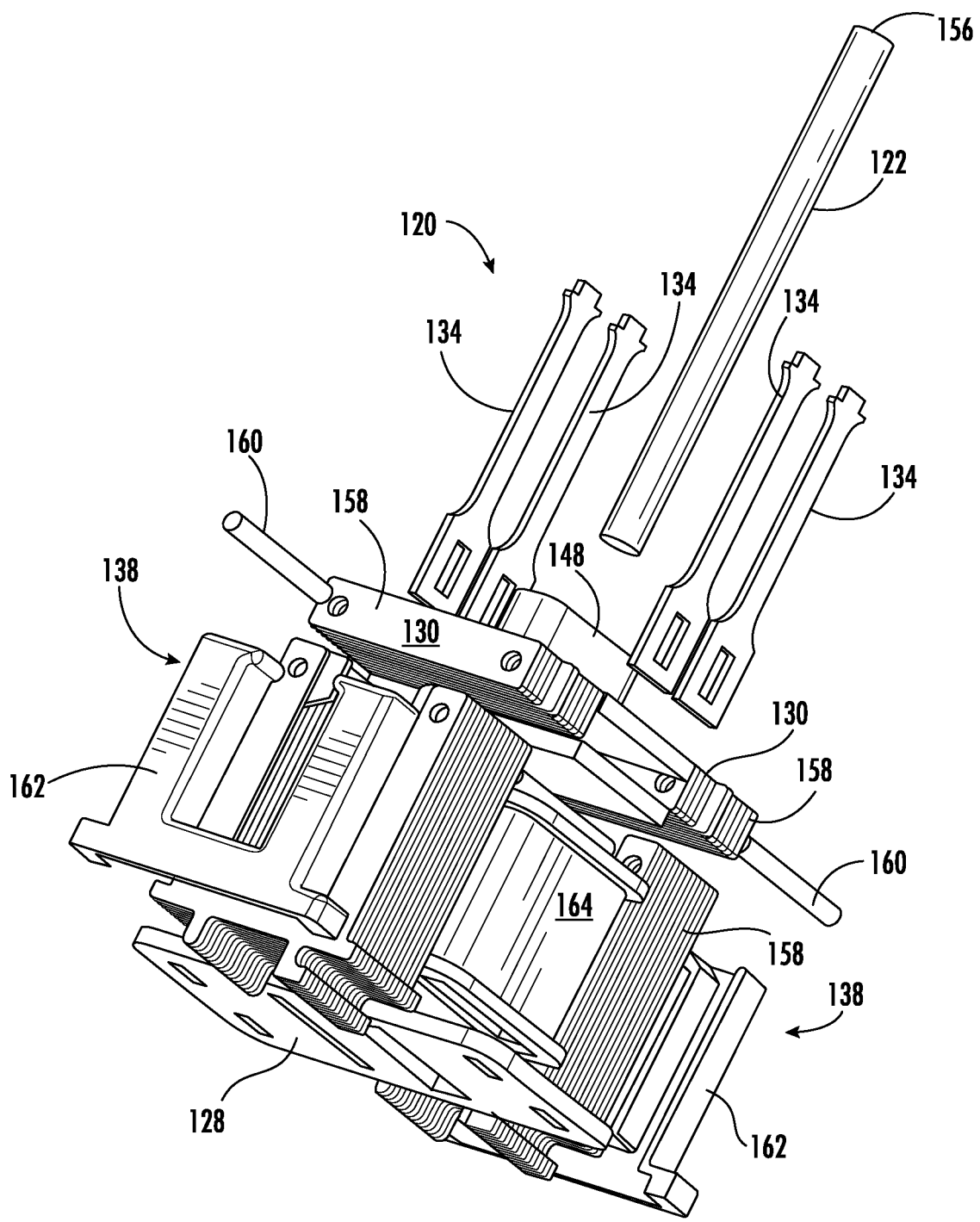
FIG. 6 is a bottom exploded perspective view of the linear actuator of FIG. 2 with the bracket removed, according to an exemplary embodiment.

FIGS. 4-6 show exploded view of linear actuator 120. Laminate layers 158 within permanent magnets 130 and/or stator 138 are coupled together with pins 160 and a cover 162 surrounds laminate layers 158. For example, a folding bobbin 164 encloses a part of laminate layers 158 on an electromagnetic coil 166 so that laminate layers 158 of electromagnet coil remain exposed in a region adjacent to permanent magnets 130. For example, cover 162 and/or bobbin 164 include a non-conductive material that provides an electric charge separator between two or more electromagnets (e.g., permanent magnets 130 and/or coils 140) in stator 138 Stator 138 is linear and includes linear laminate layers 158 of stator 138 fit within a linear rectangular box or folding bobbin 164 and linear cover 162. The coupling of linear laminate layers 158, to linear folding bobbin 164 and liner cover 162, results in a linear stator 138. Similarly, permanent magnets 130 may include linear laminate layers 158 to form a linear permanent magnet 130.

In various embodiments, two or more electromagnetic coils 166 interface with two or more permanent magnets 130. For example, in the illustrated embodiments of FIGS. 4-6, a pair of electromagnetic coils 166 on stator 138 oscillate a pair of magnets 130. Similar arrangements may be used with three, four, five, or six pairs of coils 166 interfacing with an equal number of magnets 130 or individual coils 166 and magnets 130, when permanent magnets 130 are parallel and aligned about axial axis 132.

Figure 7:
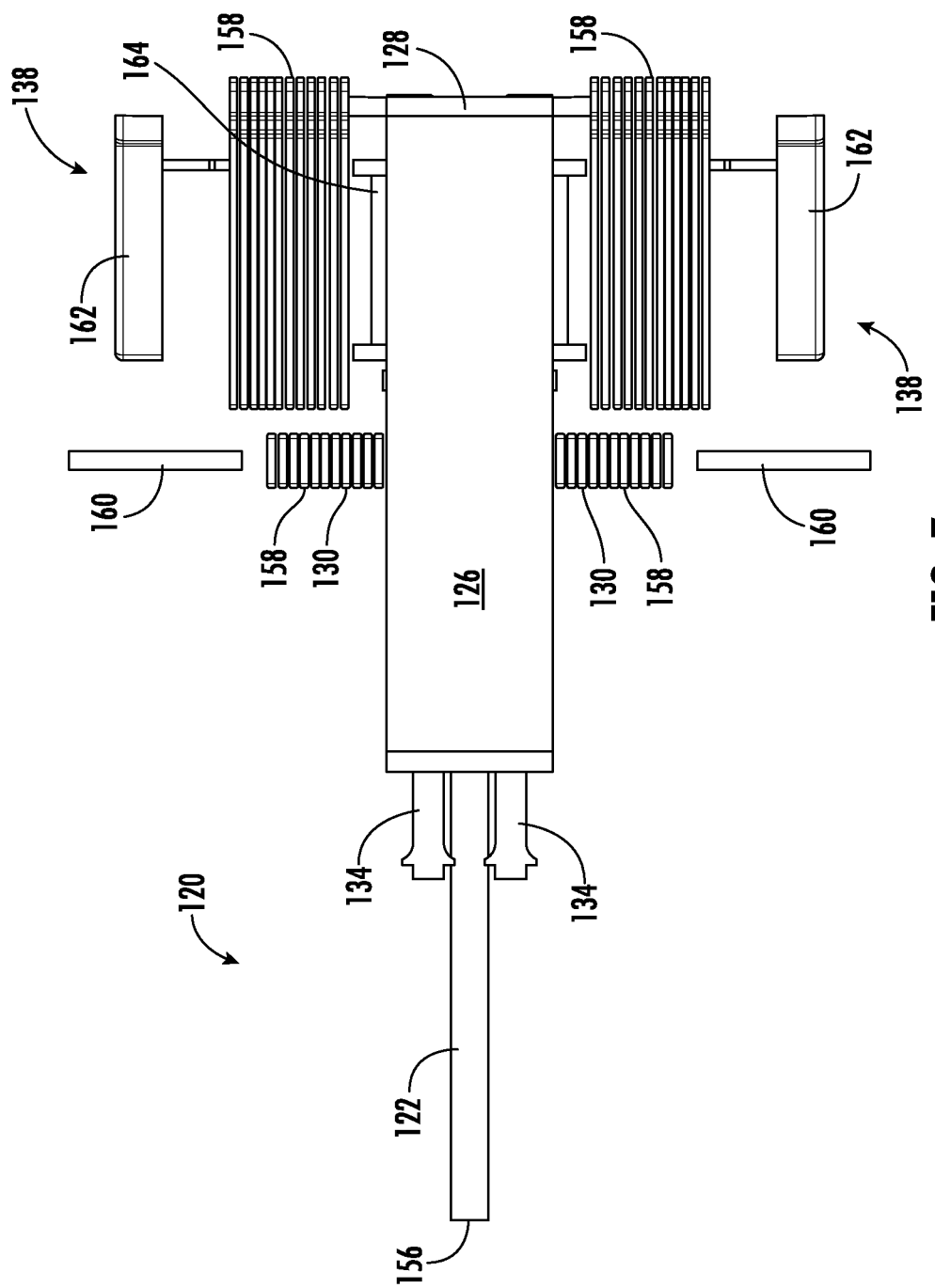
FIG. 7 is an exploded orthogonal side view of the linear actuator of FIG. 2, according to an exemplary embodiment.
Figure 8:
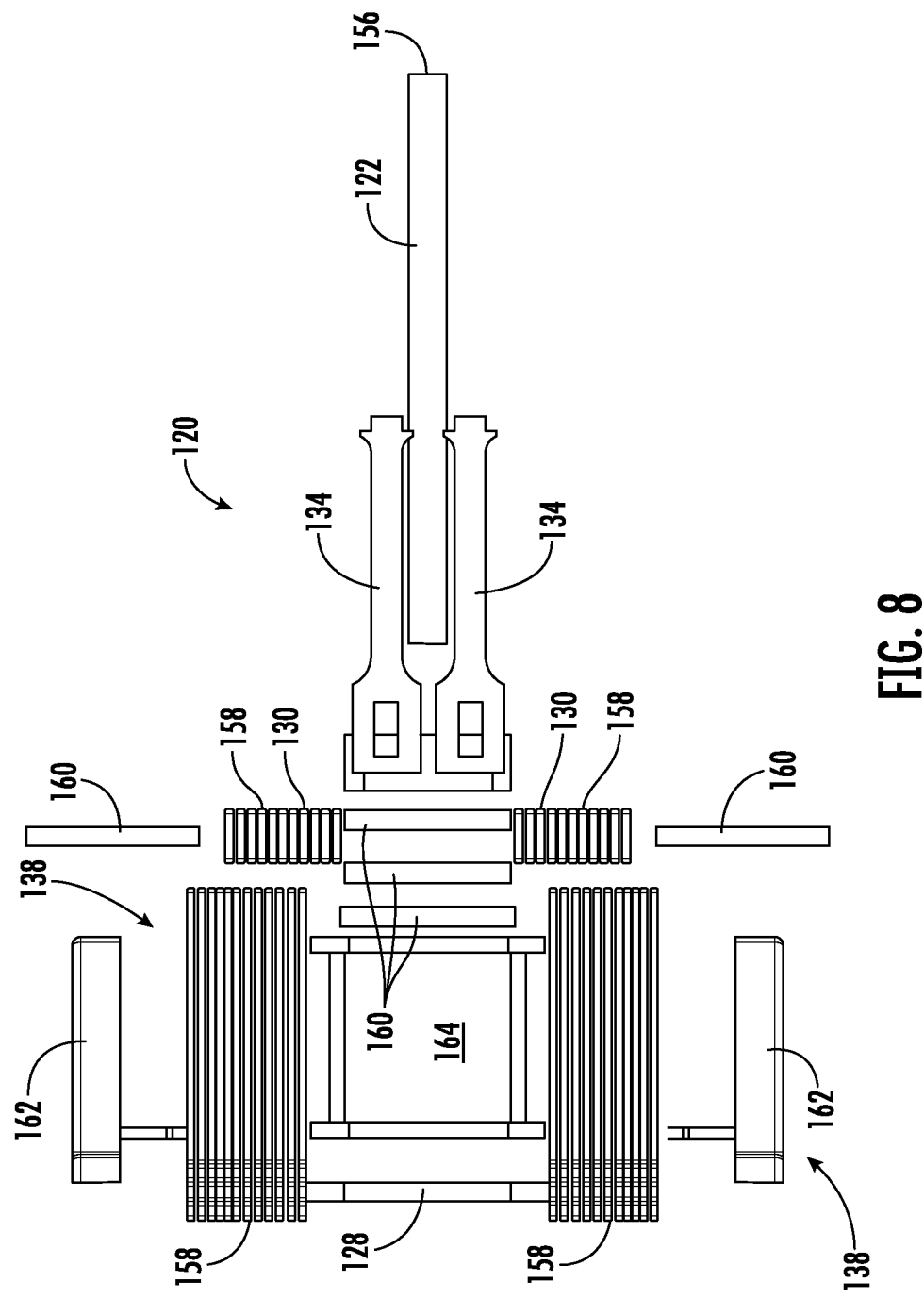
FIG. 8 is an exploded orthogonal side view of the linear actuator of FIG. 7 with the bracket removed, according to an exemplary embodiment.
Figure 9:
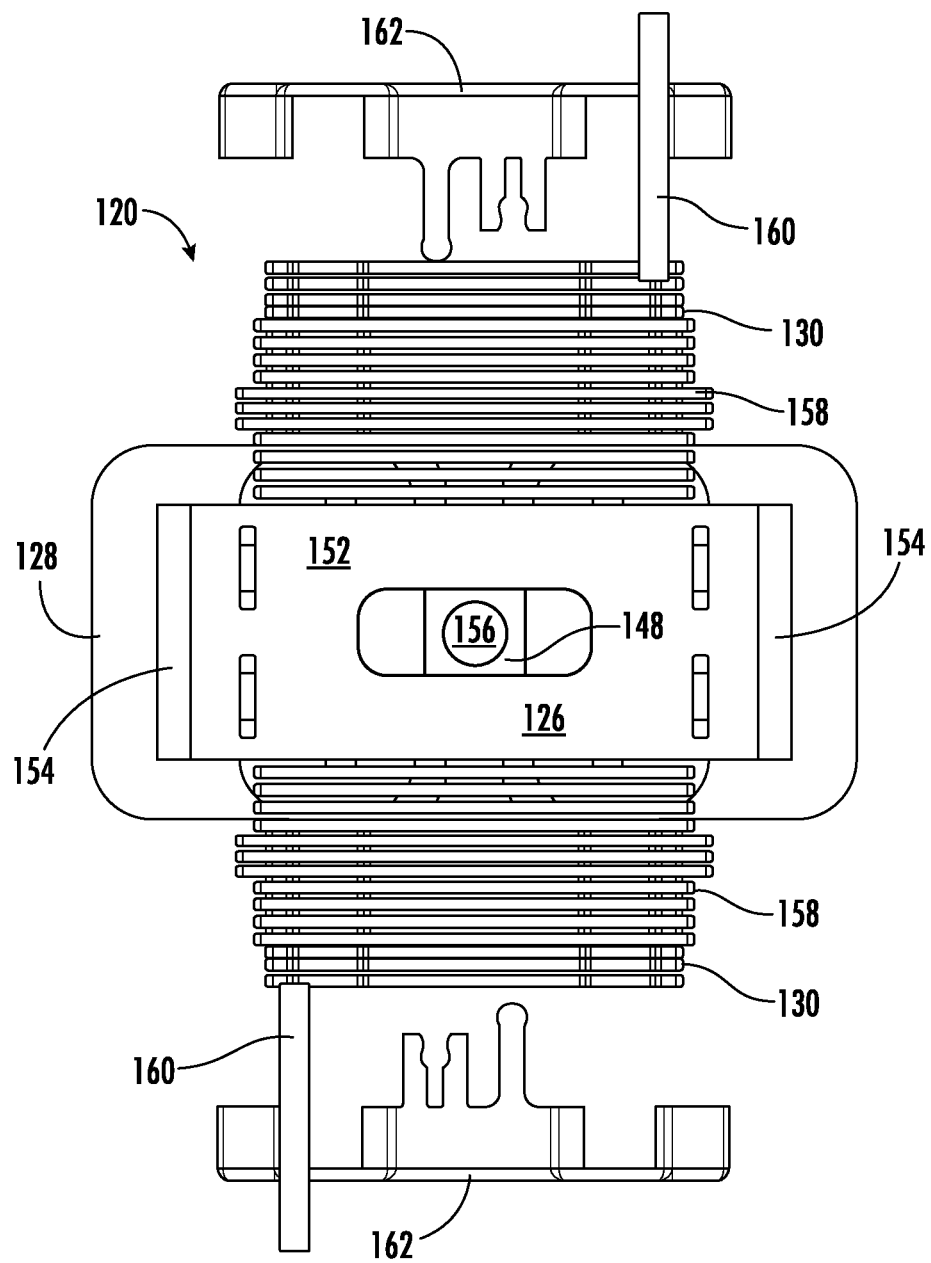
FIG. 9 is a top orthogonal side view of the linear actuator of FIG. 2, according to an exemplary embodiment.

FIGS. 7-9 show orthogonal exploded views of linear actuator 120. Similar to FIGS. 4-6, FIGS. 7-9 illustrate how the components of linear actuator 120 interrelate to include laminate layers 158 and a linear stator 138. The orthogonal views highlight the linear nature of linear actuator 120, stator 138, and laminate layers 158. Linear laminate layers 158 are located within an electromagnet (e.g., permanent magnet 130 and/or electromagnetic coil 140) to facilitate the electromotive and/or electromagnetic force that oscillates shaft 122.

Figure 10:
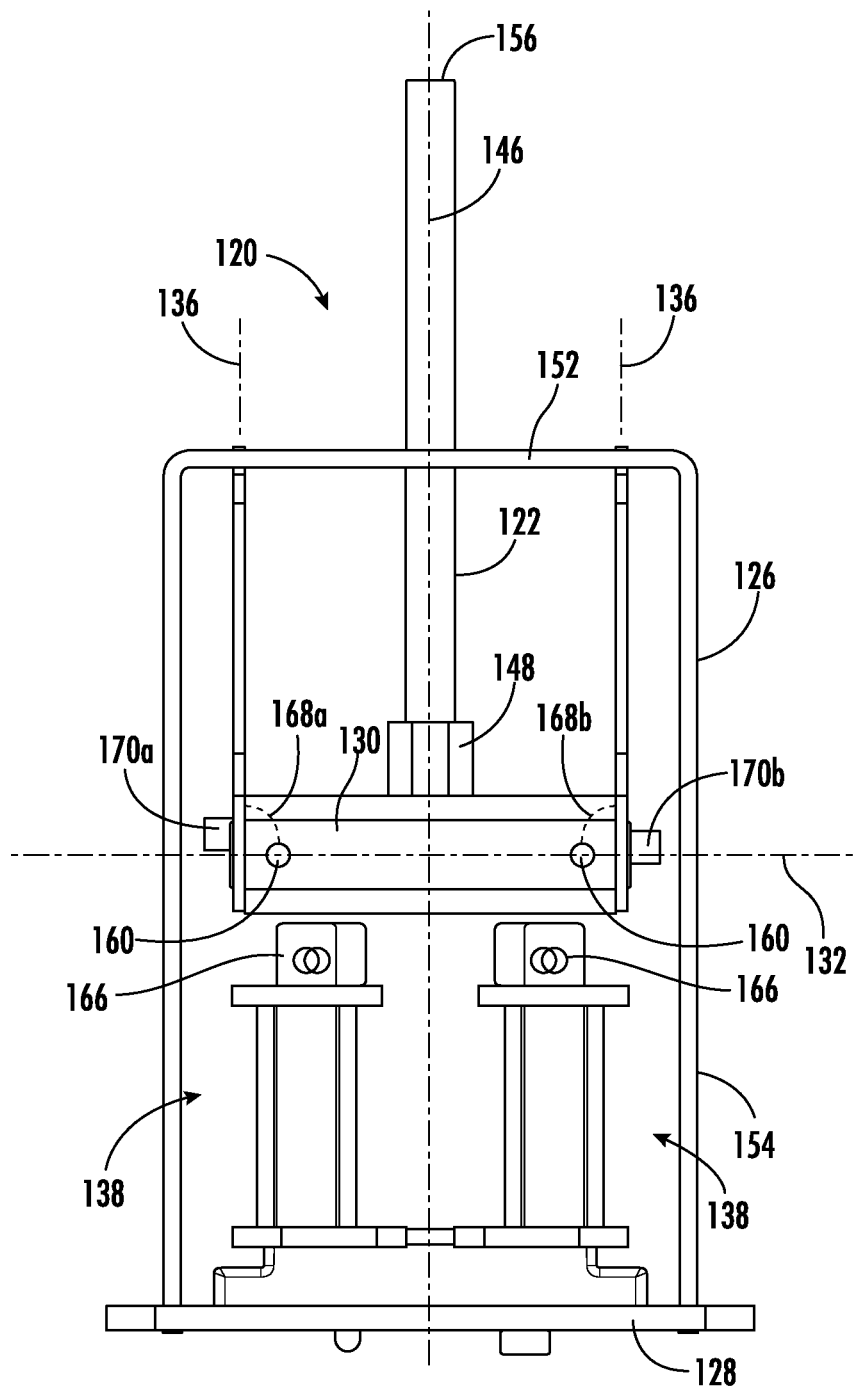
FIG. 10 is a front isometric view of the linear actuator of FIG. 2, according to an exemplary embodiment.
Figure 11:
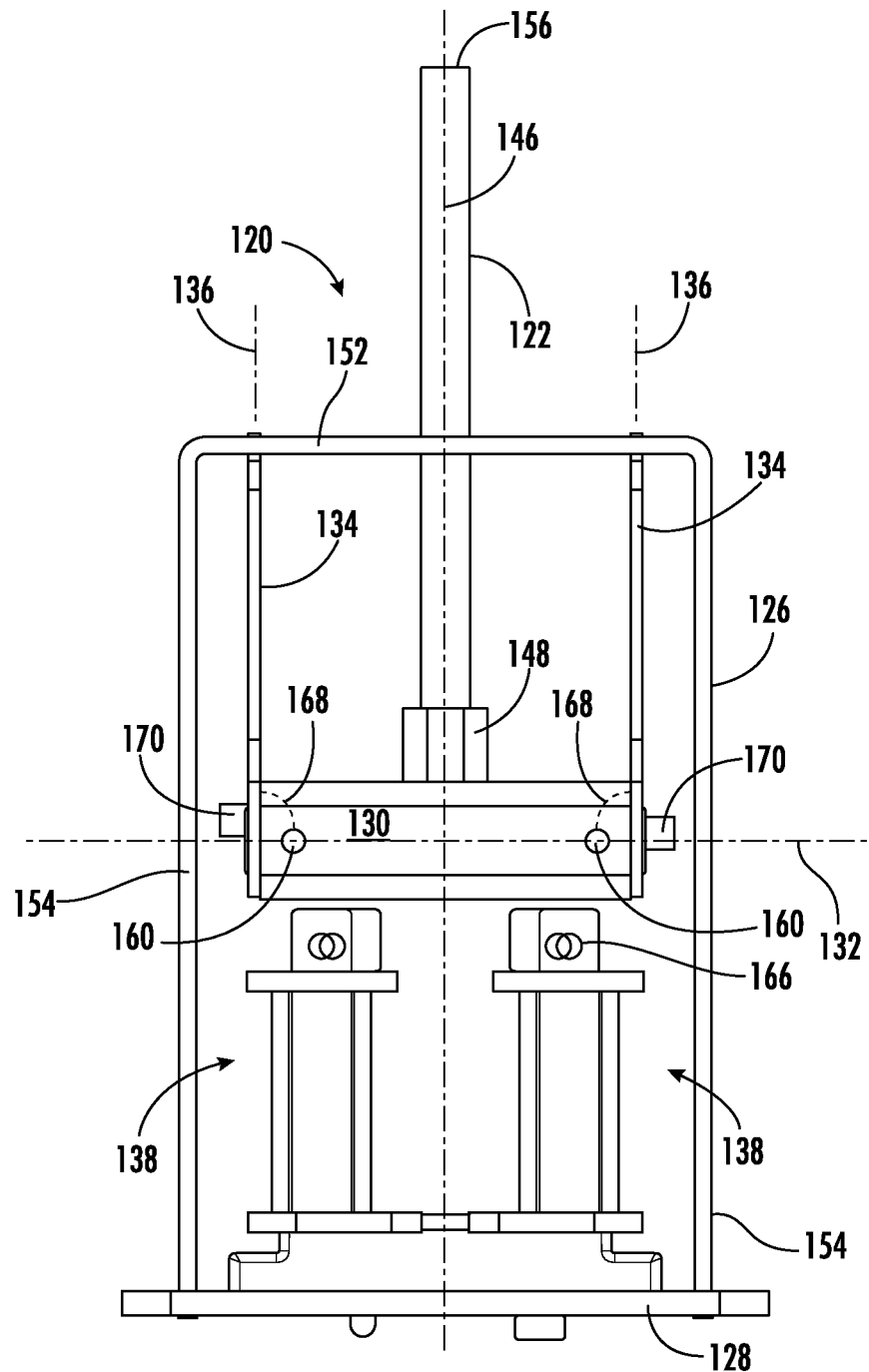
FIG. 11 is a rear isometric view of the linear actuator of FIG. 2, according to an exemplary embodiment.
Figure 14:
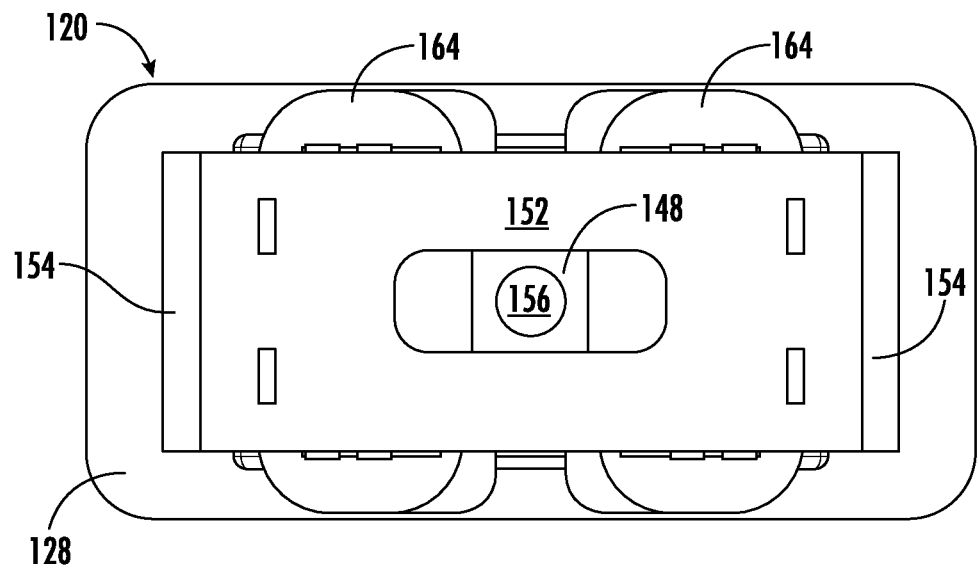
FIG. 14 is an isometric top view of the linear actuator of FIG. 2, according to an exemplary embodiment.
Figure 15:
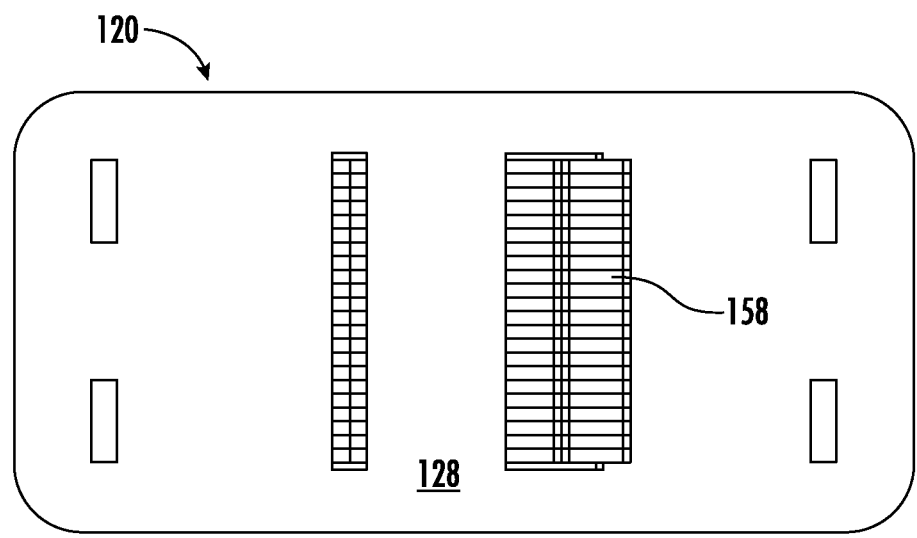
FIG. 15 is an isometric bottom view of the linear actuator of FIG. 2, according to an exemplary embodiment.

As shown in FIGS. 10 and 11, a non-zero angle 168 is formed between axis 136 of springs 134 and axial axes 132 of magnets 130. Similarly, longitudinal axis 146 of shaft 122 extends in a direction substantially parallel to the axis 136 of springs 134. This configuration creates right angles 170 on either side of shaft 122 between permanent magnets 130. For example, each permanent magnet 130 couples to a pair of springs 134 on either side of magnet 130 along axial axis 132 so that each permanent magnet 130 forms a non-zero angle 168 with each spring 134.

Stator 138 is located opposite permanent magnets 130 and includes winding 142.

This configuration uses an alternating current passing through winding 142 to oscillate shaft 122. For example, non-zero angle 168 between axial axis 132 and axis 136 of springs 134 forms a right angle 170 (e.g., orthogonal or 90°) when zero or substantially no current passes through windings 142 of stator 138.

For example, a non-zero angle 168 is formed between axis 136 of spring 134 and axial axis 132 of magnet 130 when current passes through stator 138 and a right, perpendicular, or orthogonal or right angle 170 is formed between axis 136 of spring 134 and axial axis 132 of magnet 130 when zero or substantially no current passes through stator 138.

Similarly, a sum of the non-zero angles 168 on either end of permanent magnet 130 sum to 180° as the permanent magnet 130 oscillates. For example, a reduction in a first angle 168a on one side of permanent magnet 130 relative to spring 134 is added to a second angle 168b on the opposite side. In this way, permanent magnet 130 oscillates linearly while right angles 170 remain substantially orthogonal (e.g., between 85° and 95°).

FIGS. 12-15 are isometric views of the linear actuator 120, showing a top, bottom, left and right sides of the linear actuator 120.

Figure 16:
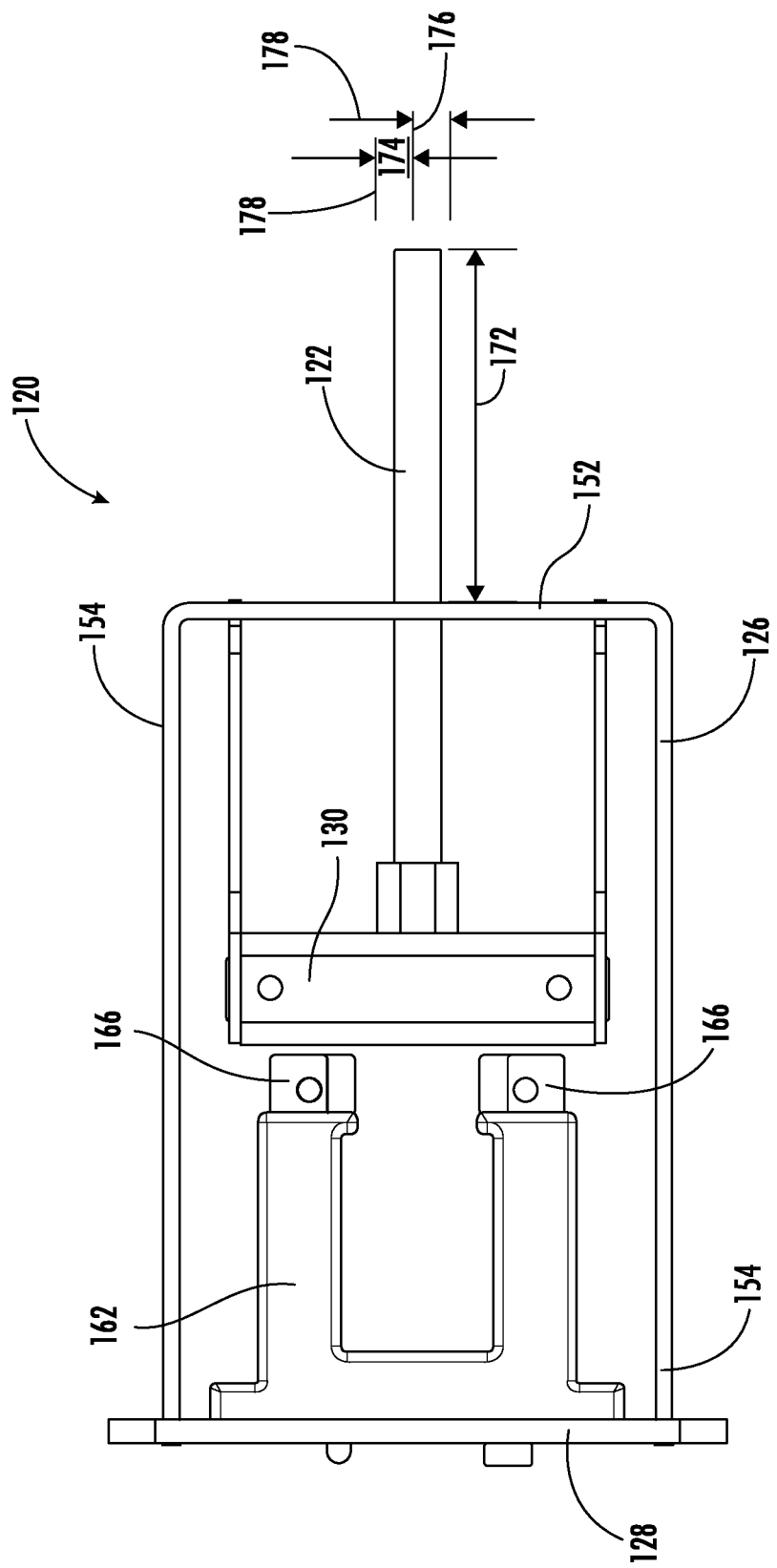
FIG. 16 is an isometric view showing some dimensions of a linear actuator, according to an exemplary embodiment.

FIG. 16 is a top view of one embodiment of linear actuator 120 showing various exemplary dimensions and specifications. For example, permanent magnets 130 are shown with a pull value of 4 kg. Magnetic pull is a measurement of the force used to pull the magnet 130 off a steel surface. In various embodiments, the pull of magnet 130 is between 1 kg and 8 kg, specifically between 2 kg and 6 kg, and more specifically between 3 kg and 5 kg. Similarly, in various embodiments, magnet 130 has a weight between 0.1 lbs and 2 lbs, specifically between 0.25 lbs and 1 lb, and more specifically between 0.4 lbs and 0.6 lbs.

Other dimensions are shown, for example a length 172 of shaft 122 that extends beyond opening 150 is 0.705". In various embodiments, length 172 is between 0.25" and 1.25", specifically, between 0.5" and 1", and more specifically between 0.6" and 0.8". In various embodiments, shaft 122 supports a load of 0.1 lbs to 1.5 lbs, specifically between 0.25 lbs and 1 lbs, and more specifically between 0.5 lbs and 0.6 lbs. In the embodiment of FIG. 16, shaft 122 supports a load of about 0.55 lbs. Similarly, shaft 122 oscillates a distance or stroke 174 from a centerline 176. Stroke 174 is measured as the maximum distance from centerline 176 to an outer oscillation location 178 of shaft 122 on either side of centerline 176. In various embodiments, stroke 174 is between 0.01" and 0.1", specifically between 0.03" and 0.08", and more specifically between 0.06" and 0.07". In the embodiment of FIG. 16, stroke 174 is about 0.065".

Figure 17:
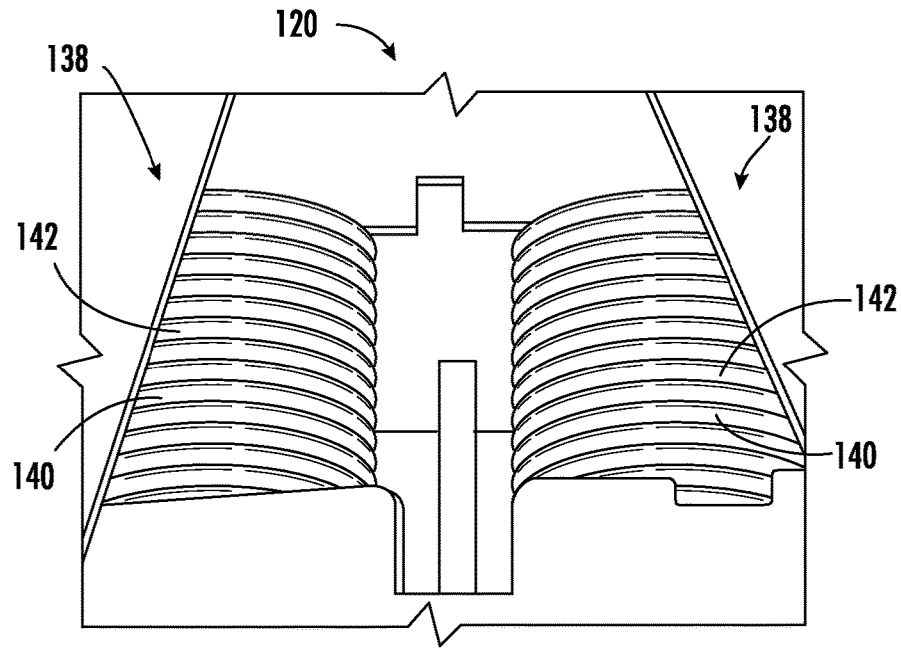
FIG. 17 is a detailed view showing an electromagnetic coil and windings on the stator of a linear actuator, according to an exemplary embodiment.
Figure 18:
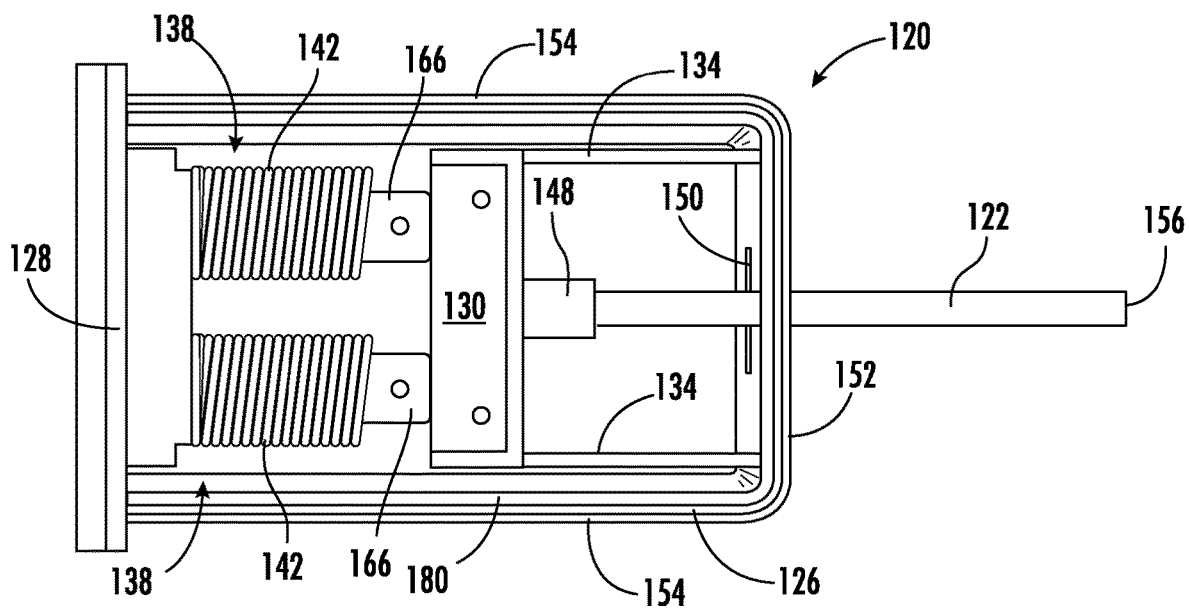
FIG. 18 is a top view of a linear motor showing the electromagnetic coils and windings on the stator, according to an exemplary embodiment.

FIG. 17 is an enlarged view of windings 142 on electromagnetic coil 166. Windings 142 are wrapped around bobbin 164 to form stator 138. FIG. 18 shows another embodiment of linear actuator 120 with windings 142 around bobbin 164, according to one embodiment. As shown in FIG. 18, bracket 126 may have a nonconductive inner or outer shell 180. The nonconductive electromagnetic isolation enhances the effect stator 138 to move and oscillate magnets 130.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A linear motor for a hair cutting device, comprising:
   a shaft having a longitudinal axis;
   a generally U-shaped bracket having a first leg and a second leg joined by a support rail including an opening, the first leg having a parallel orientation relative to the second leg;

a permanent magnet extending along an axial axis and coupled to the shaft, the shaft passing through the opening;

a pair of flat-bar springs coupled to the permanent magnet and the support rail, the springs each extending along a longitudinal axis, wherein a non-zero angle is formed between the longitudinal axis of the shaft and the longitudinal axes of the springs; and a stator opposite the permanent magnet and comprising an electromagnetic coil, wherein when an alternating current passes through the electromagnetic coil, the shaft oscillates.

2. The linear motor of claim 1, wherein the non-zero angle between the axial axis and the longitudinal axis forms a right angle when zero current passes through the electromagnetic coil of the stator.

3. The linear motor of claim 1, wherein a tip of the shaft oscillates in a direction parallel to the axial axis and oscillation of the permanent magnet.

4. The linear motor of claim 1, further comprising a frame supporting the stator and coupled to a base of the bracket, wherein the frame and the bracket are releasably coupled to surround the permanent magnet, the spring, and the stator.

5. The linear motor of claim 1, further comprising a folding bobbin that encloses a part of the electromagnetic coil, and wherein the electromagnet coil remains exposed in a region adjacent to the permanent magnet.

6. The linear motor of claim 1, wherein the shaft oscillates linearly within a yoke coupled to an inner blade, which oscillates the inner blade over a stationary outer blade.

7. The linear motor of claim 1, further comprising two or more electromagnetic coils.

8. The linear motor of claim 1, further comprising two or more permanent magnets aligned along the axial axis.

9. The linear motor of claim 8, wherein each permanent magnet couples to a pair of springs on either side of the permanent magnet along the axial axis, wherein each permanent magnet forms a non-zero angle with each spring.

10. A linear motor for a hair cutting device, comprising:
a bracket;
a frame removably coupled to the bracket;
a permanent magnet extending along an axial axis and coupled to a shaft passing through an opening of the bracket;
a spring directly coupled to the permanent magnet and extending between the permanent magnet and the bracket, the spring extending along a longitudinal axis, wherein a non-zero angle is formed between the axial axis of the permanent magnet and the longitudinal axis of the spring; and
a linear stator coupled to the frame opposite the permanent magnet and comprising an electromagnetic coil, wherein when a current passes through the electromagnetic coil, an electromagnetic force causes the permanent magnet to oscillate linearly along the axial axis and a tip of the shaft to oscillate linearly in a direction parallel to the axial axis.

11. The linear motor of claim 10, further comprising a linear laminate within the electromagnet coil to generate the electromagnetic force.

12. The linear motor of claim 10, wherein the shaft oscillates linearly within a yoke coupled to an inner blade, which oscillates the inner blade over a stationary outer blade.

13. The linear motor of claim 10, wherein the spring is a flat-bar spring.

14. The linear motor of claim 10, wherein the shaft further comprises a longitudinal axis, wherein the longitudinal axis of the shaft is parallel to the longitudinal axis of the spring.

15. The linear motor of claim 10, wherein the frame is coupled to a base of the bracket, wherein the frame and the bracket surround the permanent magnet, the spring, and the linear stator.

\* \* \* \* \*